(12) United States Patent
Nishimura et al.

(10) Patent No.: US 7,884,705 B2
(45) Date of Patent: Feb. 8, 2011

(54) SAFETY-DRIVE ASSISTANCE DEVICE

(75) Inventors: Hirofumi Nishimura, Kanagawa (JP); Hisashi Kurokawa, Kanagawa (JP); Makoto Mochizuki, Kanagawa (JP)

(73) Assignee: Panasonic Corporation, Osaka (JP)

( * ) Notice: Subject to any disclaimer, the term of this patent is extended or adjusted under 35 U.S.C. 154(b) by 282 days.

(21) Appl. No.: 12/096,673

(22) PCT Filed: Dec. 4, 2006

(86) PCT No.: PCT/JP2006/324169

§ 371 (c)(1), (2), (4) Date: Jun. 9, 2008

(87) PCT Pub. No.: WO2007/069489

PCT Pub. Date: Jun. 21, 2007

(65) Prior Publication Data

US 2009/0128311 A1 May 21, 2009

(30) Foreign Application Priority Data

Dec. 12, 2005 (JP) .............................. 2005-357710

(51) Int. Cl.
- B60Q 1/00 (2006.01)
- B60K 28/60 (2006.01)
- B60L 3/02 (2006.01)
- B60T 7/14 (2006.01)
- G08G 1/16 (2006.01)

(52) U.S. Cl. ......................... 340/436; 180/272; 701/301

(58) Field of Classification Search ................. 340/436; 180/271, 272, 274; 701/301
See application file for complete search history.

(56) References Cited

U.S. PATENT DOCUMENTS

| 6,906,619 | B2 * | 6/2005 | Williams et al. | 340/425.5 |
| 6,989,754 | B2 * | 1/2006 | Kisacanin et al. | 340/576 |
| 7,209,833 | B2 * | 4/2007 | Isaji et al. | 701/301 |
| 7,468,653 | B2 * | 12/2008 | Takahashi | 340/435 |
| 7,710,246 | B2 * | 5/2010 | Arakawa et al. | 340/435 |

FOREIGN PATENT DOCUMENTS

JP 2005251111 A 9/2005

\* cited by examiner

*Primary Examiner*—Jennifer Mehmood
(74) *Attorney, Agent, or Firm*—Pearne & Gordon LLP

(57) ABSTRACT

The present invention is to provide a safety-drive assistance device that can judge whether a driver recognizes an object to which a driver should pay an attention or not even if an accuracy of detecting a visual-line direction is almost equal to once degree. A traffic environment detecting unit 11 detects an object such as an automobile, a pedestrian, a road mark and a traffic signal. A watched target judging unit 12 judges a watched target among the objects, to which a driver pays attention. A visual-line direction detecting unit 13 detects a visual-line direction of a driver. A visual recognition judging unit 14 judges whether a driver visually recognizes the watched target or not, based on the watched target and a fluctuation pattern of a direction of either or both eyes of the driver. A non-safety recognition judging unit 15 judges whether a driver recognizes non-safety or not, based on the result of visual recognition judged by the visual recognition judging unit 14. A presentation unit 16 informs the content of non safety, based on the result of judging on safety judged by the non-safety recognition judging unit 15.

6 Claims, 14 Drawing Sheets

SAFETY-DRIVE ASSISTANCE DEVICE

TECHNICAL FIELD

The present invention relates to a safety-drive assistance device that informs an automobile driver about any possibilities of risks such as a collision, a rear-end collision, and contacting to a pedestrian.

BACKGROUND OF TECHNOLOGY

Conventionally, as a device for informing an automobile driver about a dangerous state or a safety state, the device judges whether a driver recognizes a traffic environment or not and informs him/her about risk factors depending on the level of the recognition.

FIG. 11 is a schematic view of the conventional safety-drive assistance device. The safety-drive assistance device judges a direction to which a driver pays attention as a necessarily watched direction, obtains watching frequencies as how often a driver looks at the necessarily watched direction and judges whether a driver recognizes a traffic environment using such frequencies (see the patent document 1).

FIG. 12 is a schematic view of the other conventional safety-drive assistance device. This safety-drive assistance device judges a watched point from a driver's visual-line direction, defines a watched area as a neighborhood around the watched point and judges whether a driver recognizes a states of road facilities or not depending on whether these road facilities exist within the watched area or not (See the patent document 2).

In case of informing an automobile driver about any possibilities of risks such as a collision, a rear-end collision, and contacting with a pedestrian, it is desirable that a device warn a driver when it is necessary. Namely, it is not necessary that a device warns a driver about a dangerous state if he/she already knows such state. Such warning gives a driver bothersome if he/she receives unnecessary warning.

For example, if a device warns a driver only in a case when a device detects an object which a driver possibly overlooks, making a driver face a dangerous situation at a cross section and a driver overlooks such object which should be recognized by him/her, it is possible for a device to efficiently assist a driver for driving with safety.

Patent Document 1:
Japanese Unexamined Patent Publication No. 7-167668 (page 7, FIG. 1)

Patent Document 2:
Japanese Unexamined Patent Publication No. 2005-182307 (page 13, FIG. 4)

DISCLOSURE OF THE INVENTION

Problem to be solved by the Invention

However, there are many different small and large objects to which a driver should pay an attention and a driver also has to pay an attention to a small actual object being far away from him/her during driving.

For example, as shown in FIG. 13, when a device judges whether a driver visually recognizes a traffic signal 100 m ahead or not, it is difficult for a device to accurately determine it since the size of the signal is around 30 cm. In particular, when a device judges such recognition using frequencies of overlapping a visual-line direction over an object, it is impossible for a device to accurately recognize such overlapping if the detection accuracy of the visual-line direction is not under 0.17 degrees.

On the other hand, as a technology of detecting a visual-line direction, there is a method of reflecting a purkinje image of which detecting accuracy is 0.3 to 0.4 using a near infrared ray camera (see pp. 307-312, 2002, the eighth image sensing symposium "a method of measuring a visual-line direction based on eye configuration model"). Such detection accuracy is insufficient.

Further, even if accuracy attains under 0.17 by improving a solution of a camera, such improvement needs an increasing cost since a device for detecting a visual-line direction with high accuracy is needed.

Further, it is difficult how to define a visual-line direction itself in consideration of an eye structure of a human being. Namely, a human eye has strong color recognition and eyesight in an area of which diameter is 2 mm and outside periphery of a posterior pole of an eyeball called as a macula flava. Further, a human eye recognizes sight information by a mapped image which is caught by an area called as a central fossa. Hence, it is difficult to define regarding what a part of such a macula flava and a central fossa becomes a standard position of a visual-line direction.

Further, as shown in FIG. 14, according to a method of setting a gazing area along a watched point and judging whether an object exists within the watched area or not, in a case when a driver looks at a plurality of overlapped objects to be judged as visual recognition, it is impossible to judge which an object among such objects he/she looks at.

In order to overcome the above issue, the present invention is to provide a safety-drive assistance device being capable of judging whether a driver recognizes an object to which a driver should pay an attention or not even if the accuracy of detecting a visual-line direction is around one degree.

Means to solve the Problem

According to an aspect of the invention, a safety-drive assistance device comprising: a traffic environment detecting unit operable to detect an existence or a state of an predetermined object; a watched target judging unit operable to judge a watched target among the objects, to which a driver pays attention for safety driving; a visual-line direction detecting unit operable to detect a direction defined as a line of sight a visual-line direction of two eyes or one eye of a driver; a visual recognition judging unit operable to judge whether the driver visually recognizes the watched target or not, based on a relationship between the watched target and movement patterns defined as a locus of a line of sight of a visual line direction detected by the visual-line direction detecting unit; a non-safety recognition judging unit operable to judge whether the driver recognizes non-safety or not, based on the result of visual recognition judged by the visual recognition judging unit; and a presentation unit operable to inform the content of non safety based on the result of judging non safety judged by the non-safety recognition judging unit.

According to this structure, a device can determine whether a driver visually recognizes a watched target or not, based on a fluctuation pattern of a direction of either or both eyes of the driver, making a high accurate visual-line detecting device become unnecessary, restraining a cost.

ADVANTAGE OF THE INVENTION

The present invention judges whether a driver recognizes a watched target or not, based on a fluctuation pattern of a direction of either or both eyes of the driver, being capable of judging whether a driver recognizes an object to which a driver should pay an attention or not even if the accuracy of detecting a visual-line direction is around one degree.

EXPLANATION OF THE REFERENCE NUMERALS

Figure 1:
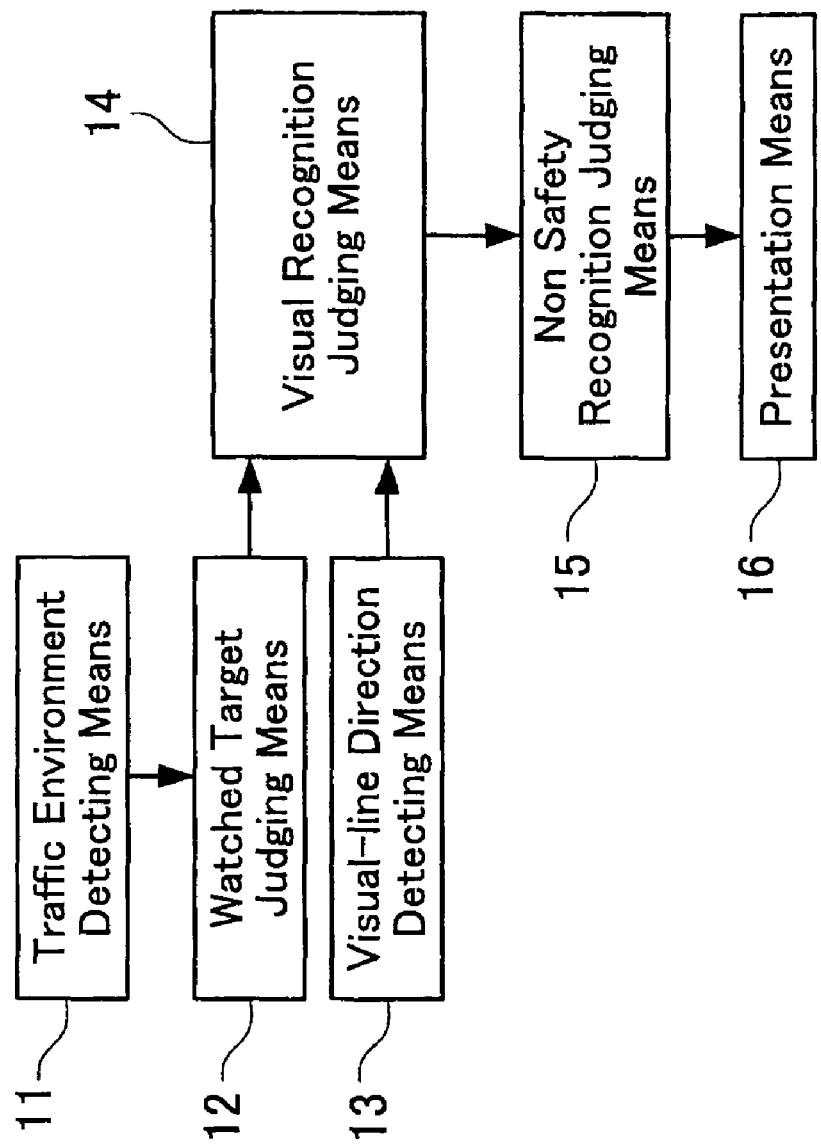
FIG. 1 is a block diagram of a safety-drive assistance device according to a first embodiment of the invention.

11: traffic environment detecting unit
12: watched target judging unit
13: visual-line direction detecting unit
14: visual recognition judging unit
15: non-safety recognition judging unit
16: presentation unit

THE PREFERRED EMBODIMENTS OF THE INVENTION

Embodiments of the invention will now be described with reference to the accompanying drawings.

First Embodiment

FIG. 1 is a diagram showing a safety-drive assistance device according to the first embodiment of the present invention.

As shown in FIG. 1, the safety-drive assistance device according to the first embodiment comprises a traffic environment detecting unit 11, a watched target judging unit 12, a visual-line direction detecting unit 13, a visual recognition judging unit 14, a non-safety recognition judging unit 15, and a presentation unit 16. The traffic environment detecting unit 11 detects moving objects such as automobiles and pedestrians and existences or situations of road facilities such as traffic signs and signals. The watched target judging unit 12 judges a level of selecting or watching an object to which a driver should pay an attention for safety driving among objects detected by the traffic environment detecting unit 11. The visual-line direction detecting unit 13 detects a visual-line direction of both eyes or one eye of a driver. The visual recognition judging unit 14 judges whether a driver looks at an object or not, based on a watched object judged by the watched target judging unit 12 and movement patterns of a visual-line direction detected by the visual-line direction detecting unit 13, or judges a level of visual recognition. The non-safety recognition judging unit 15 obtains a level of non-safety of a driver based on a result of judging visual recognition judged by the visual recognition judging unit 14. The presentation unit 16 informs contents of non safety based on a result of judging non-safety judged by the non-safety recognition judging unit 15.

Figure 2:
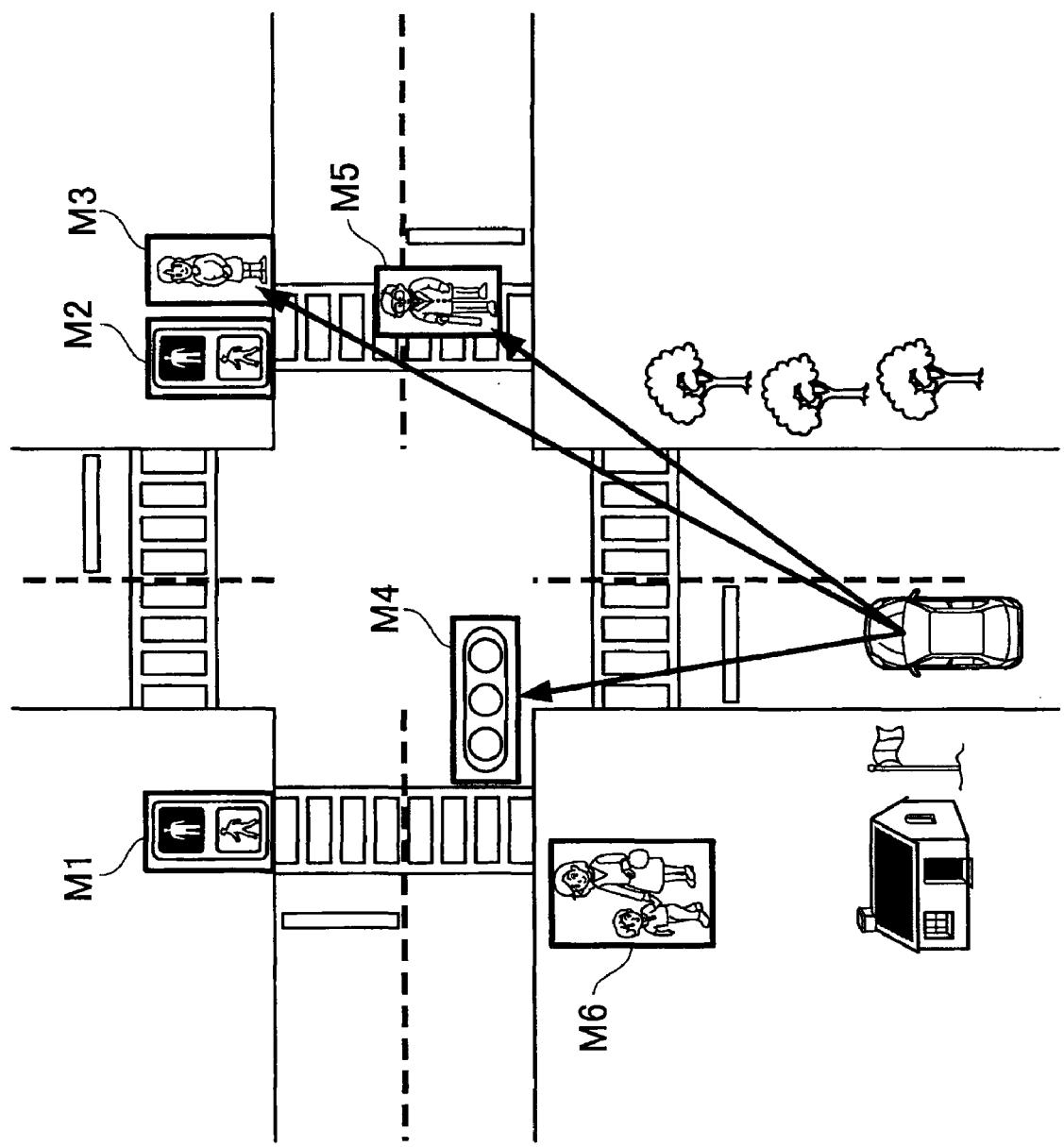
FIG. 2 is a diagram showing an example of an object which should be detected by the safety-drive assistance device according to the first embodiment of the invention.

The traffic environment detecting unit 11 includes a camera shooting an image ahead of an automobile and a sensor composed of a calculator for example. As shown in FIG. 2, it detects a pedestrian as well as traffic signals for an automobile and a pedestrian. In FIG. 2, objects are signals for a pedestrian M1, M2, a signal for a automobile and a bicycle M4 and pedestrians M3, M5, and M6. The objects may include a mark painted on a road such as a pedestrian crossing and a stop sign.

More specifically, two cameras are installed in an automobile room such as a stereo camera in order to shoot an image head of an automobile. A calculator processes images shot by two cameras every frame.

First, the calculator smoothes the image by using a moving average in order to remove an image noise, and extracts edges by extracting high frequencies components of the image using a digital filter.

On the other hand, pluralities of images of objects to which a driver should pay an attention such as an automobiles, pedestrians and signals are prepared. The calculator extracts edges of these images.

Then, the traffic environment detecting unit 11 detects an object to which an driver should pay an attention by matching an image of a pattern between the result of edge extraction obtained via a camera and an image, which is prepared in advance, of the object of the extracted edges.

Further, the calculator calculates the difference between two images obtained by two cameras and sight difference between the two images. It defines an object existing nearby if it has a large sight difference and the other object being far away if it has a small sight difference. In such case, it can obtain a relationship between an automobile owned by a driver and an object through triangulation.

If an object is a moving object such as an automobile and a pedestrian, the position of it, the velocity of it and the direction to which the object is forwarding are detected. More specifically, it records the relative relationship of the object regarding a shot image every frame and calculates the moving speed of the object and direction by the difference between frames. Two-dimensional coordinate is set with respect to the coordinated of the relative position as the following. The automobile driven by a driver is an original point, the direction to which the automobile is heading is y axis as a positive direction and the right side of the automobile is x axis as a positive direction. Moving objects detected by the traffic environment detecting unit 11 include automobiles, motorcycles, and bicycles.

The watched target judging unit 12 selects an object to which a driver should pay an attention among objects detected by the traffic environment detecting unit 11.

For example, if the automobile goes straight, an object to which a driver should pay an attention is assumed to be a traffic signal for the automobile driven by a driver M4. In such case, when the traffic environment detecting unit 11 estimates that an pedestrian 6 is heading to the automobile driven by a driver, the pedestrian 6 may be included in objects to which a driver should pay an attention.

On the other hand, objects, to which a driver should pay an attention, are assumed to be a signal for the automobile driven by a driver M4 and pedestrians M3 and M5 if the automobile turns right. As a means of selecting an object, a pedestrian on right side of the automobile driven by a driver is defined as an object.

Regarding a way of judging whether a pedestrian is on the right of the automobile, the pedestrian is assumed to be located at the positive x-axis using the above two-dimensional coordinate.

Whether the automobile goes straight or turns right is judged by detecting a winker signal. Further, it is possible to estimate whether the automobile goes straight or turns right when a driver forgets turning on a winker, based on memorized information. Such information is features of acceleration, braking and handling in case of going straight and turning right.

Further, it may accumulate a past mileage record and estimate running track of turning right and judges whether the automobile can turn right with sufficient distance to the pedestrian M5. The pedestrian M5 may be removed from objects, to which a driver should pay an attention if the automobile has a sufficient distance from it.

In such case, whether the automobile has a sufficient distance or not is judged by the following. Euclidean distance between the automobile and a pedestrian regarding the estimated truck is calculated until predetermined time using two dimensional coordinates as the automobile driven by a driver being an original point and then the above determination is performed so that the distance is under a predetermined value.

Here, the watched target judging unit 12 is separated from the traffic environment detecting unit 11. But, there is no specific limitation of a structure regarding the relationship between the watched target judging unit 12 and the traffic environment detecting unit 11 in the embodiment. For example, a watched target judged by the watched target judging unit 12 is simply integrated with a region to which a driver should pay an attention such as a forward right side region and included in the traffic environment detecting unit 11. This simplification can reduce a calculation process of the traffic environment detecting unit 11.

An object to which a driver should pay an attention is only the traffic signal M4 for the automobile driven by a driver in case of going straight, the traffic signal M4 for the automobile driven by a driver and pedestrians M3 and M5 in case of turning right hereafter.

The visual-line direction detecting unit 13 detects a visual-line direction of a driver. As a particular example, a method of detecting a visual-line direction line based on papillary cornea reflection method using a near-infrared ray camera will be explained.

A near-infrared ray camera is placed at a position where it shoots an image of driver's eyes. For example, it is placed on a dashboard or a room mirror. In such case, a light emitting diode (LED) for emitting a near-infrared ray is similarly placed at the position of a camera's optical axis.

A near-infrared ray emitted from the LED is used when shooting an image of a driver's eye. The central position of pupil is detected by a shot image. When detecting a pupil, after detecting eye's position, a part which is the darkest shot image in the center is also detected and defined as a pupil.

The position of an eye is detected by extracting an edge, for example. A curve having an arc stretched toward left and right is detected as an upper eyelid or a lower eye lid.

Further, a reflected image of LED which was irradiated when an eye was shot is detected. A reflected image of LED is a bright point appeared on an eyeball. Hence, the most simplified detecting method is to detect the brightest part within an eyeball.

Then, a visual-line direction of a driver is detected by the relationship between the center of a pupil and the reflected image of LED. Namely, if a pupil is overlapped over the reflected image, the direction of a camera is matched to the visual-line direction. But, if a pupil is deviated from the reflected image, the visual-line direction exists by the amount of deviation.

The direction of a visual-line direction may be detected by one eyeball or both two eyeballs, which was not referred in the above explanation. In such case, each of visual line directions for two eyeballs is obtained and the distance to an object is obtained from the difference between angles of such visual lines. This distance may be used at the time of judgment of the visual recognition judging unit 14.

The visual recognition judging unit 14 judges whether a driver recognizes an object from moving patterns of visual lines or not. The principle of it is explained referring to FIG. 3 to FIG. 6.

Figure 3:
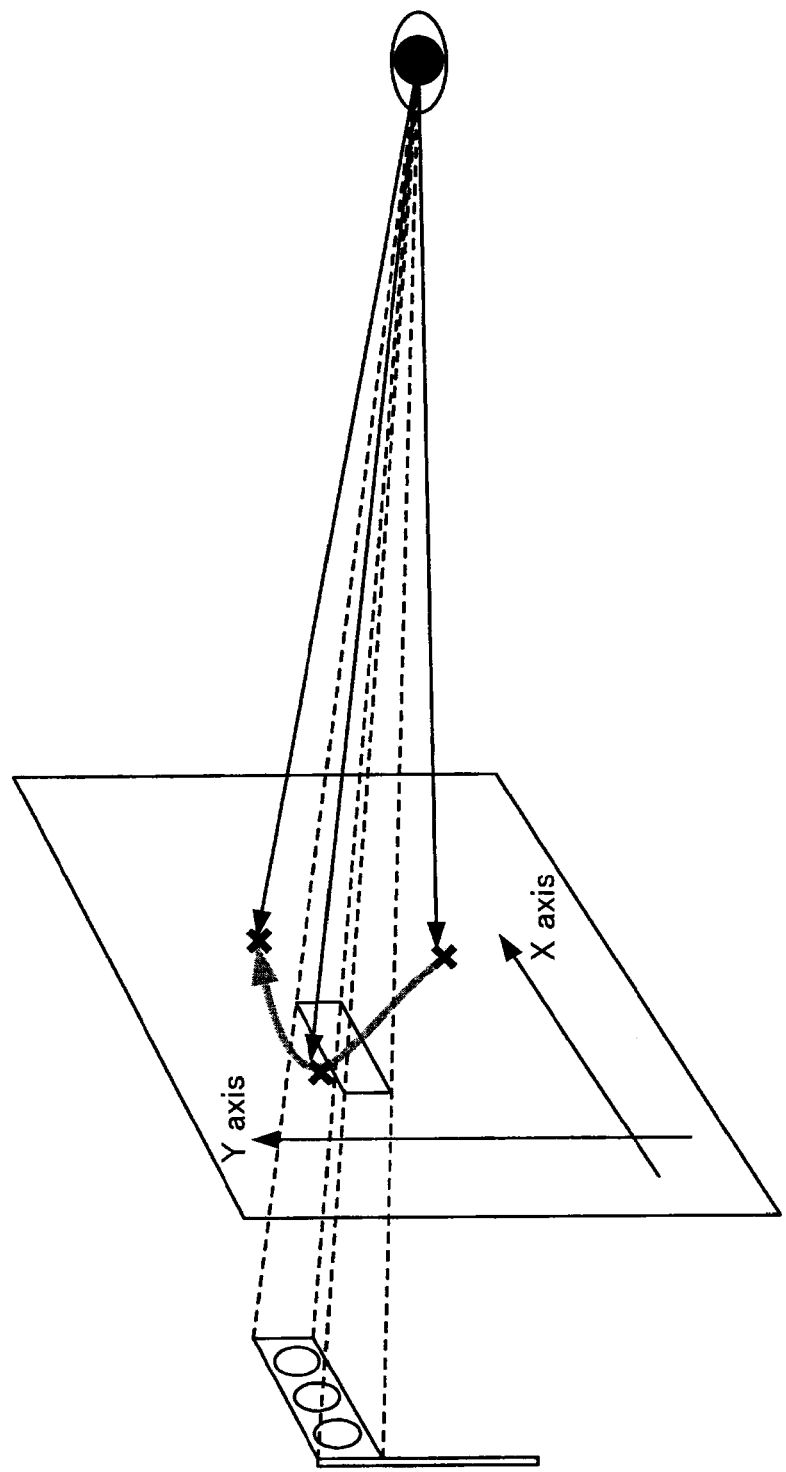
FIG. 3 is a diagram showing an example of a second dimension set for the safety-drive assistance device according to the first embodiment of the invention to determine visual recognition.

First, as shown in FIG. 3, a two-dimensional space using X axis and Y axis is set between an object and a driver. Y axis is set so that an upper direction becomes plus along a vertical direction. X axis is set so that a right direction becomes plus along a horizontal direction. The original point is set at the face surface of a driver in the explanation though the point may be set anywhere.

An object as a watched target judged by the watched target judging unit 12 among objects detected by the traffic environment detecting unit 11 is presented on the two-dimensional space of X-Y axes. At this time, the line between the position of a driver's eye and an object is mapped on the position of crossing the two-dimensional space of X-Y axes. FIG. 3 shows an example of mapping to the two-dimensional space of X-Y axes. In this case, an example is a traffic signal and the range of an outer frame of the traffic signal is mapped on the space.

On the other hand, the direction of a visual-line direction detected by the visual-line direction detecting unit 13 is mapped on the two-dimensional space of X-Y axes. Such mapping enables the relationship between an object and a visual-line direction to be compared on the two-dimensional space of X-Y axes.

Figure 4:
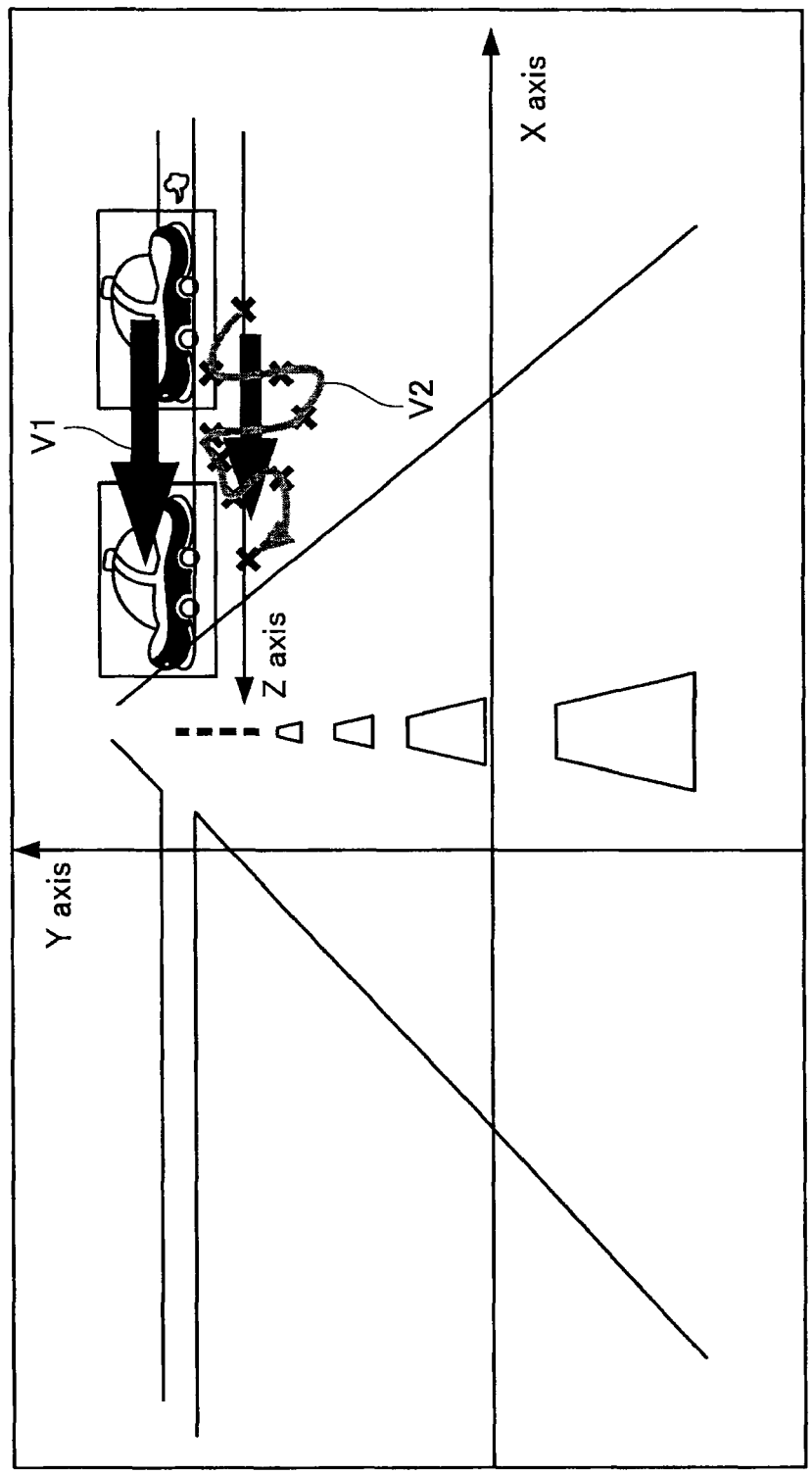
FIG. 4 is a diagram showing a method of visual recognition judged by the safety-drive assistance device according to a first embodiment of the invention.

FIG. 4 is a conceptual view of a method of judging whether a driver looks at an object or not using moving patterns of a visual-line direction.

In FIG. 4, an example of mapping on the two-dimensional space of X-Y axes is a case where an automobile is an object moving from right to left. Here, in order to simplify explanation, the automobile driven by a driver is stopped.

When judging whether a driver looks at an automobile or not, first, an object which is not clearly recognized is excluded in order to reduce objects to be judged as recognized ones. For example, a threshold of a predetermined angle is set toward a visual-line direction. An object, which exists outside of the range obtained by adding the threshold with upper, lower and left, right directions of a detected visual-line direction, is defined as an object which is not clearly recognized. Such object is excluded from objects which are judged as recognized ones.

This threshold may be set as a range from 5 degrees to 30 degrees which is an effective sight range for a driver. Otherwise, it may be set as a maximum value of a detection error in detecting a visual-line direction.

Next, a vector of a moving pattern regarding objects which are candidates to be judged as recognized ones is obtained. In the example of FIG. 4, moving an automobile as an object is detected and a moving pattern of an automobile is obtained and expressed as a vector V1. This vector is obtained by setting a predetermined period, expressing positions of an automobile at starting time and ending time as an X-Y space and defining the difference of these positions.

Here, a vector of a moving pattern for an object is obtained after focusing candidates which are judged as recognized ones. But, vectors of moving patterns for all detected objects may be obtained and then objects which are not clearly recognized may be removed from candidates. In such case, during a predetermined period which is set when obtaining vectors of moving patterns for an object, it may be judged whether objects are not clearly recognized or not from a visual-line direction. Then, during this period, objects which are judged as not clearly being recognized may be removed.

On the other hand, moving patterns regarding moving directions of a visual-line direction are checked during the same period for detecting movement of an automobile. A visual-line direction is happened to have a large error because of detecting accuracy described above. Hence, moving patterns for it are detected from an entire trace of a visual-line direction detected during a predetermined period, not from the positional difference between starting time and ending time.

More specifically, a position for every direction of a visual-line direction detected every frame image of a shot eye is mapped on the X-Y two-dimensional space. Then, a mapped position is defined as a sampling point. In FIG. 4, "x" is sampled point for each of above positions.

Then, a regression line for sampled points is obtained and Z axis for a new dimension is set on the X-Y two dimensional space. The plus and minus directions of Z axis are judged from the relative relationship between sampled points of starting time and ending time. In case of FIG. 4, Z axis is in parallel to x axis in the X-Y two dimensional space and its plus and minus directions is inverted against X axis. Then, Z axis is defined as a vector direction of movement of a visual-line direction in the X-Y two dimensional space.

Further, a maximum value and a minimum value for all sampled points are obtained using Z axis and the absolute value of the difference between the maximum value and the minimum value is calculated for all sampled points. Then, the size of a vector for movement of a visual-line direction is obtained by multiplying the absolute value with a predetermined value under 1.

Further, a locally changed point of a visual-line direction may be extracted and a vector for movement of a visual-line direction every period between changed points may be obtained. The locally changed point for a visual-line direction is detected if the difference between current and previous frames of the detected result of a visual-line direction excesses over a predetermined threshold.

Figure 5:
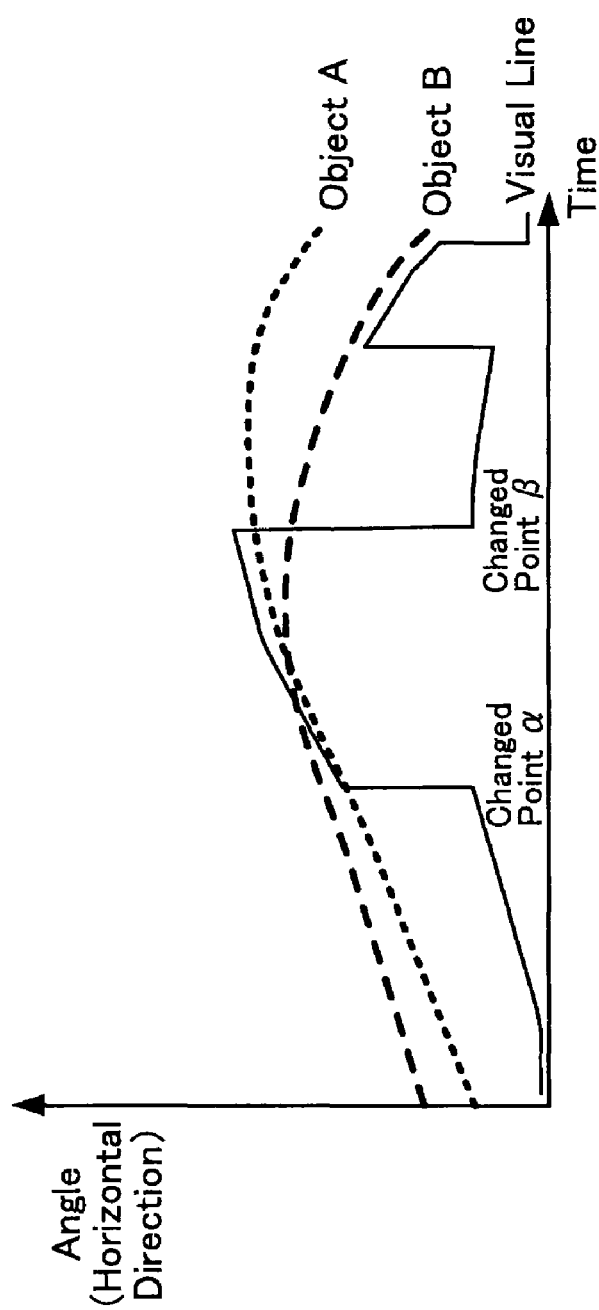
FIG. 5 is a graph showing an example of movement of a visual-line direction of the safety-drive assistance device according to the first embodiment of the invention and an object.

FIG. 5 is a graph showing changes of an angle between a visual-line direction along a horizontal direction and the front surface of an object. In this example, points $\alpha$, $\beta$, of which an angle of a visual-line direction is changed are extracted as changed points and a vector of movement of a visual-line direction is obtained during this period.

In this case, a vector for movement patterns of a visual-line direction may be obtained by the difference between changed points simply extracted on the two dimensional space. The direction of a vector may be a regression line and the size of a vector may be a distance between the directions of a visual-line direction at the changed points extracted on the two dimensional space.

Further, a vector for movement patterns of an abject is obtained from the movement between extracted changed points.

Further, in a case when only an initial part of the changed point is detected and a continuous changed point is not extracted even after elapse of a predetermined period, a point after elapse of the predetermined period may be defined as a changed point to obtain a vector.

Then, the inner product of a movement vector V1 for an object and a movement vector V2 for a line of shi is calculated. If the ratio of the volume of the inner product to the volume of the movement vector V1 is over a predetermined value, it is judged that a driver looks at an object.

Accordingly, when visual recognition about whether a driver looks at an object or not using movement pattern of an object and a visual-line direction is judged, it is possible to judge whether a driver looks at an object or not even if detecting accuracy of a visual-line direction is insufficient and a detected direction of a visual-line direction is not overlapped with an object. Further, the accuracy of judging visual recognition is further improved if the distance from Z axis to an object is added to the above judging method.

Figure 6:
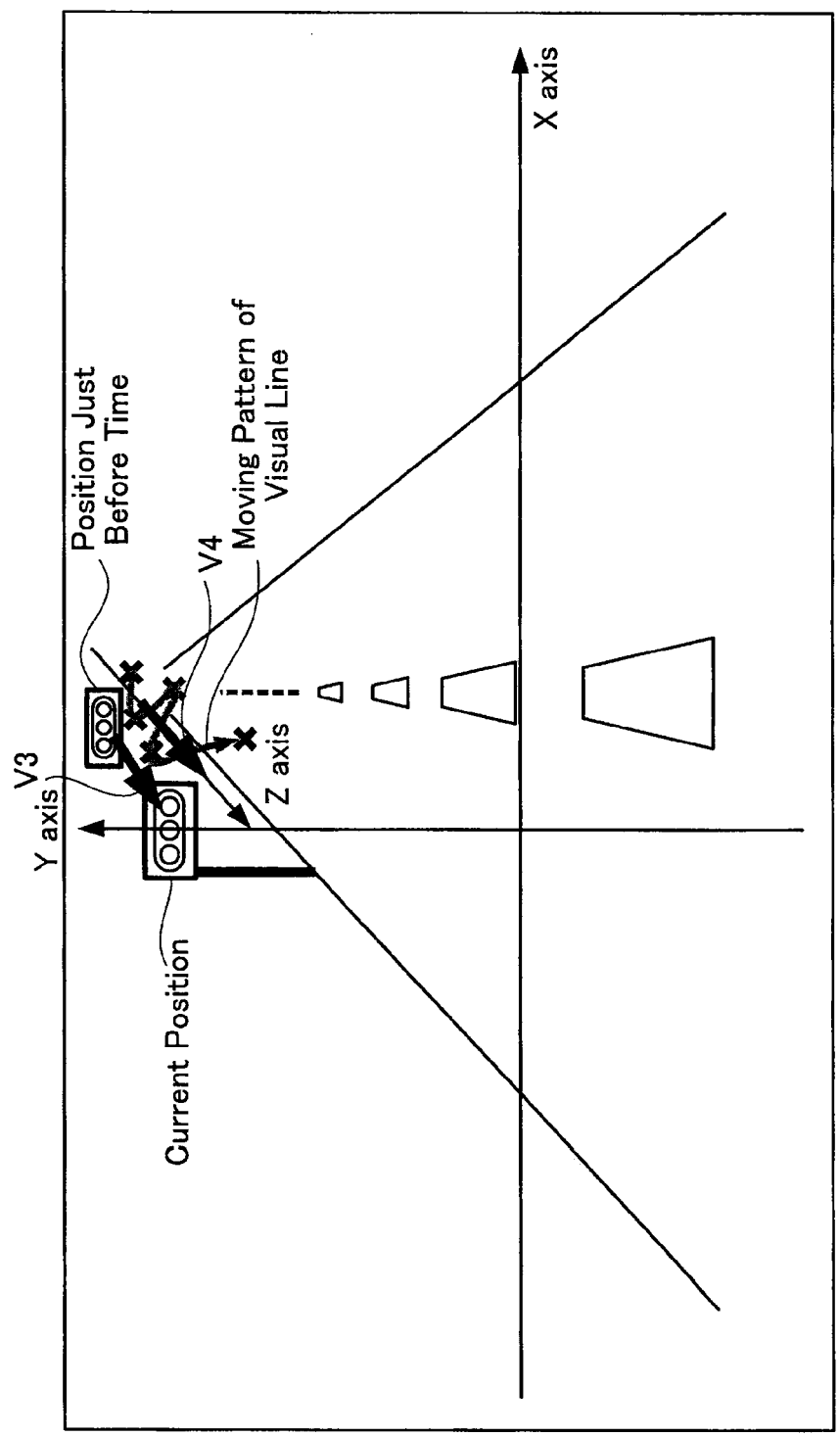
FIG. 6 is a diagram showing another method of visual recognition judged by the safety-drive assistance device according to the first embodiment of the invention.

FIG. 6 is a conceptual view of a method of judging whether a driver looks at an object or not using moving patterns of a visual-line direction when the automobile driven by the driver is moving. Basic concept is similar to the case shown in FIG. 4 and details are omitted here.

FIG. 6 shows a traffic signal as an example. A traffic signal and a road marker are not moving objects. But it is possible that they are considered to be relatively moving objects regarding a case when the automobile driven by a driver is moving. Hence, the processes explained in FIG. 4 can be applied to this example.

Namely, a predetermined period is set and then a vector V3 is obtained as movement of the position of a traffic signal on the X-Y dimensional space. Then, a vector V4 for movement of a visual-line direction is obtained similarly to the case shown in FIG. 4. Namely a regression line is obtained from sampled points of directions of a visual-line direction and Z axis is set on the X-Y dimensional space.

Then, the inner product of these vectors V3 and V4 is obtained. It is judged that a driver looks at an object if the ratio of volume of the inner product to the absolute value of the vector V3 is larger than a predetermined value.

Here, an inner product and a size of a vector for an object are used for comparing vectors of movement of an object and movement of a visual-line direction. But, if the size of a movement vector of a visual-line direction is compared, it is possible to judge visual recognition with further higher accuracy.

The non-safety recognition judging unit 15 judges non confirmation of safety depending whether the visual recognition judging unit 14 judged visual recognition or not, based on a watched target judged by the watched target judging unit 12.

For example, when an automobile goes straight, it is enough to judge whether the signal M4 in FIG. 2 is visually recognized or not. When an automobile turns right, it is enough to judge whether the signal M4, and pedestrians M3 and M5 in FIG. 2 are visually recognized or not. Namely, if any one of objects is not judged as visually recognized, a driver judges non safety confirmation.

Further, it may be judged by the following whether a driver confirmed safety against any of objects or not. A predetermined period is set and defined as a period for judging safety confirmation. Then, if the visual recognition judging unit 14 judges that a driver visually confirms an object more than one time, it is judged that a driver confirmed safety about the object.

Starting time of a period for judging safety confirmation may be time of passing a predetermined distance from an intersection or time before predetermined time until entering the intersection or predetermined time before current time. Ending time of a period for judging safety confirmation may be time when the distance to an object as a watched target judged by the watched target judging unit 12 gets to be close to a predetermined distance, timing when time of reaching an object gets to be shorter than predetermined time by estimating a trace of a driver's automobile based on its speed, acceleration and turning angle, or timing when the automobile passes a position of completing the judgment of safety confirmation after the central position of a intersection or stop line is defined as a standard point and a predetermined passing point is set as the position of completing the judgment of safety confirmation. Then, when it is judged that safety is not confirmed, information such as a kind of an object of which recognition is insufficient and it's direction is output to the presentation unit 16.

The presentation unit 16 may display an image using a monitor, may guide a driver with a voice massage using a speaker, or may guide a driver using both a monitor and a speaker. As an example, a method of informing an emergency content using a speaker will be explained.

First, the traffic environment detecting unit 11 prepares voice message data for recognizing every one of objects to be detected and stores them as electronic data. Such voice massage may be a sound of "automobile" when an automobile is recognized or a sound effects which can image automobile's running. Voice messages for all objects such as a traffic signal, a pedestrian, a motor bicycle, and a bicycle detected by the traffic environment detecting unit 11 are prepared and stored as electronic data.

If the non-safety recognition judging unit 15 judges that a driver fails to confirm safety against an object judged by the watched target judging unit 12, a voice message corresponding to such object is converted into analogue signal by digital to analog converter and its gain is amplified by a power amplifier and output from a speaker.

In this case, a plurality of speakers may be installed. Then a driver may recognize a direction of an object by hearing a sound from the speaker which is the most nearest to the direction after relative direction of an object of which safety is neglected by a driver is calculated. Further, the same effect may be attained by reducing numbers of speakers and using sound image localization technology Further, in the embodiment, the two dimensional space is used when comparing an object with a direction of visual-line direction. But, an actual three dimensional space may be used. In such case, a direction of each of visual-line directions for both eyes may be independently detected and the distance from a driver to an object is calculated from the difference between two angles. Such calculated result is used for judging visual recognition.

According to the present embodiment, using moving patterns of a visual-line direction can judge whether a driver looks at an object or not even if the detecting accuracy of a direction of visual-line direction is a level which is not overlapped with an object to be judged.

Further, the visual recognition judging unit 14 judges that a driver visually recognizes a watched target if there is a relationship between moving patterns of a watched target and moving patterns of a visual-line direction during a predetermined period, being capable of judging such visual recognition without a highly-accurate device detecting a visual-line direction since it judges the visual recognition by movement such as chasing the watched target with eyes.

The visual recognition judging unit 14 extracts a predetermined changed point of a visual-line direction and judges the relationship between moving patterns of a watched target and moving patterns of a visual-line direction during a period between extracted changed points, being capable of judging an appropriate period for judging visual recognition.

Second Embodiment

A safety-drive assistance device according to a second embodiment of the present invention will now be described. The second embodiment is substantially the same in construction as the first embodiment. Hence, only featured components of the safety-drive assistance device of the second embodiment different in construction from those of the safety-drive assistance device of the first embodiment will be explained using FIG. 1.

The visual recognition judging unit 14 in the safety-drive assistance device of the second embodiment judges whether a driver visually recognizes an object based on an overall movement pattern of a visual direction.

Figure 7:
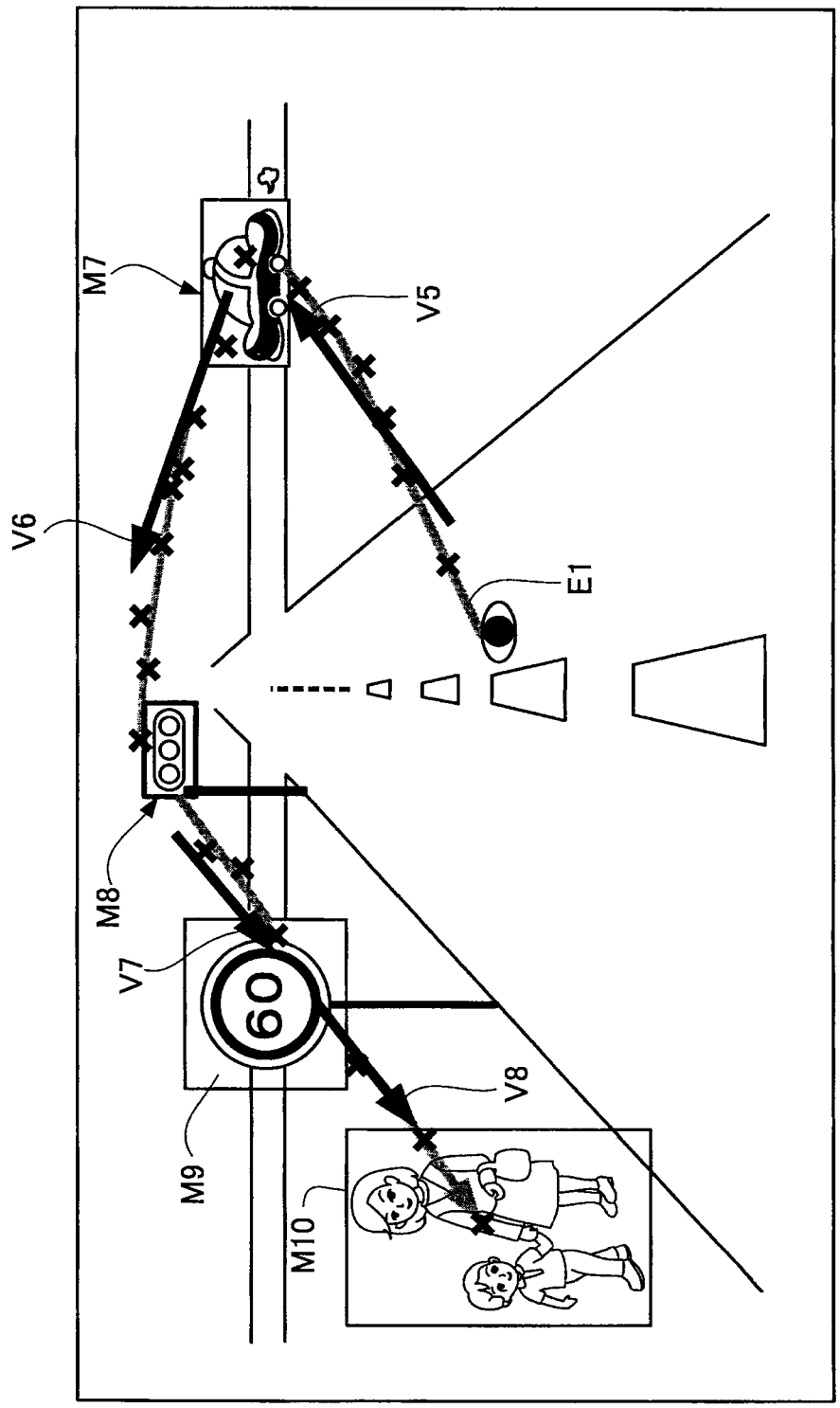
FIG. 7 is a diagram showing a method of visual recognition judged by the safety-drive assistance device according to a second embodiment of the invention.

FIG. 7 is a schematic view of a method of judging visual recognition by the safety-drive assistance device of the second embodiment, which is represented by the two dimensional space explained in the first embodiment. In FIG. 7, a detected visual-line direction is represented as "x" and "E1" is a moving direction of a visual-line direction for a driver. In the embodiment, a case when a driver looks at an object M8 after looking at an object M7 is exemplified.

First, an overall movement pattern about a visual-line direction in the vicinity of an object is obtained before judging visual recognition.

Whether a visual-line direction is directed to the vicinity of an object or not is judged by the following. Coordinate values of sampled points of visual-line directions during a predetermined period on the X-Y two dimensional space is averaged and then it is judged whether the averaged coordinate value is under a predetermined distance from an object which is judged to be recognized or not.

Here, the detail will be explained by exemplifying the object M7. There are sampled points of visual-line directions in the vicinity of the object M7. Coordinate values of sampled points of visual-line directions during a term from starting E1 to the right side of the object M8 are averaged, becoming a value under the judged distance from the object M7.

Then, the overall moving direction V5 of visual-line directions from the sampled point when starting to obtain the averaged value to the standard sampled point is obtained. The standard sampled point is the point of a midterm of a period of calculating an average value so as to judge whether a visual-line direction is in the vicinity of the object or not.

More specifically, a regression line from the starting sampled point to standard sampled point is obtained. Then the size of a vector is obtained similarly to the first embodiment. Similarly, an overall moving direction V6 is obtained using sampled points from the standard sampled point to the final sampled point where the averaged value was calculated.

Next, an angle between overall moving direction vectors V5 and V6 is calculated. If the angle is large, it judged whether a driver visually recognized an object as a predetermined value being a threshold value. At this time, the inner product of two vectors may be calculated and the inner product may be divided by the sizes of the two vectors to obtain an index without directly calculating an angle between two vectors. This index may be used for judging whether visual recognition is performed or not.

This method judges visual recognition since an angle between two vectors is large in the case of the object M7. On the other hand, in the case of the object M9, two vectors V7 and V8 are obtained. But, the angle between these two vectors is small, judging that visual recognition is not recognized.

Accordingly, it is possible to determine whether a driver looked at an object or not using overall moving patterns of visual-line directions regardless accuracy of detecting visual-line directions.

Further, the visual recognition judging unit 14 judges that visual recognition is performed if the direction of a visual-line direction is in the vicinity of a watched target and the amount of directing the watched target and backing away from it are changed more than a predetermined amount with respect to moving patterns of the direction of a visual-line direction is in the vicinity of a watched target. Hence, it can judge with a detecting accuracy of one degree regarding visual-line direction detecting accuracy about whether a driver recognizes an object which is small and far away from him/her or not.

Third Embodiment

A safety-drive assistance device of a third embodiment of the invention will now be described. The third embodiment has substantially the same structure of the first embodiment. Hence, only featured components will be explained using FIG. 1.

The visual recognition judging unit 14 in the embodiment judges whether an driver visually recognizes an object or not, based on whether a moving pattern of a visual-line direction in the vicinity of an actual object can be applied to a feature of a moving pattern of a visual-line direction at the time of visually recognizing the object or not. This judgment is based on a feature of moving patterns of a visual-line direction in the vicinity of an object at the time when each object of predetermined set objects is visually recognized. Here, such each object of predetermined set objects is classified depending on their kinds.

Figure 8:
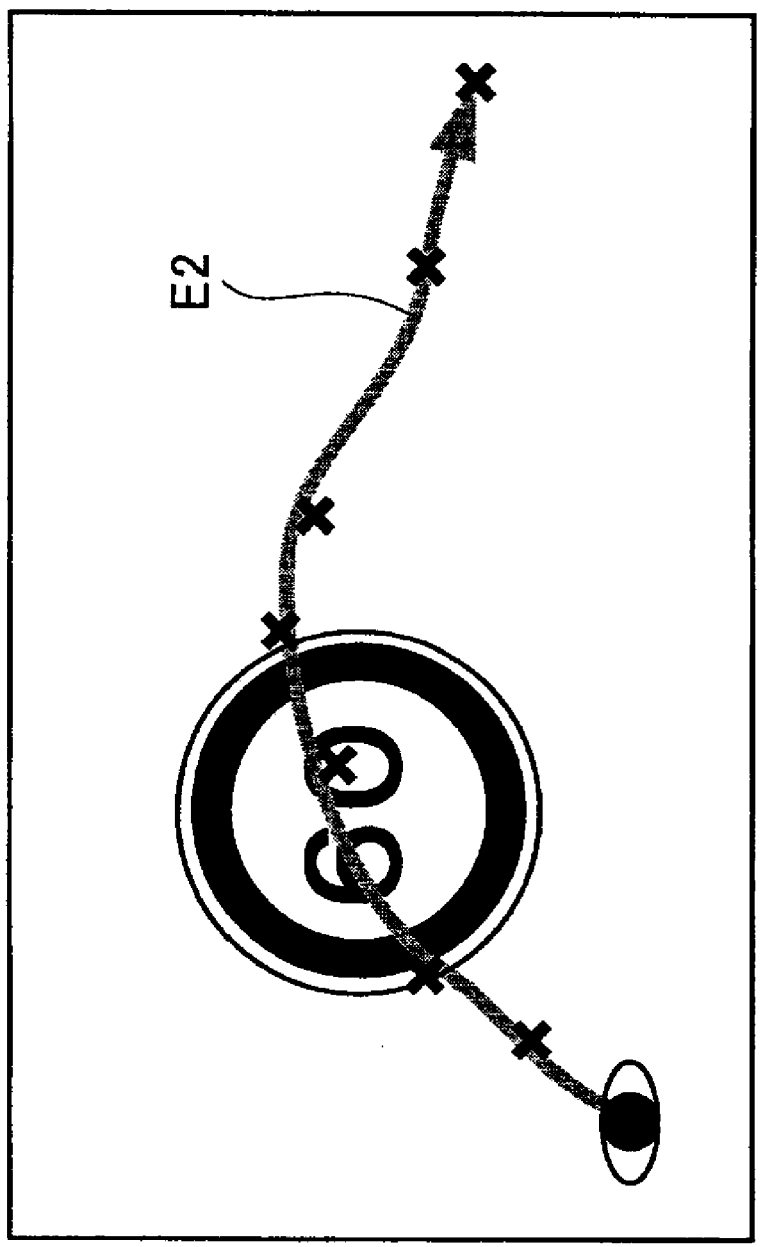
FIG. 8 is a diagram showing an example of a movement pattern of a visual-line direction when the safety-drive assistance device according to the third embodiment of the invention recognizes a road marker.
Figure 9:
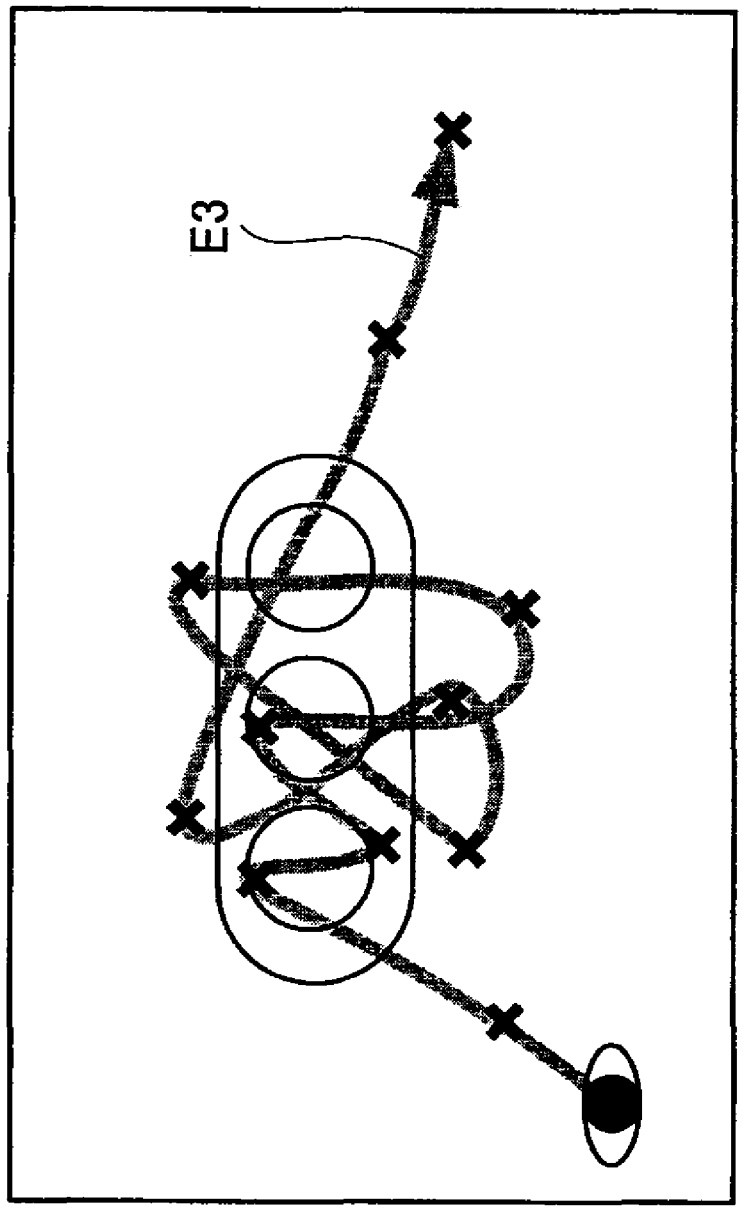
FIG. 9 is a diagram showing an example of a movement pattern of a visual-line direction when the safety-drive assistance device according to the third embodiment of the invention recognizes a traffic signal.

FIGS. 8 and 9 are a schematic view of a method of judging visual recognition by the safety-drive assistance device of the present embodiment, which is represented by the two dimensional space explained in the first embodiment. In FIGS. 8 and 9, a detected visual-line direction is represented as "x" and "E2 and E3" represent moving of a visual-line direction of a driver.

Here, in order to simplify the explanation, as shown in FIG. 8, a content of a road mark sign is easily recognized and moving patterns of a visual-line direction are smoothed for example. Further, as shown in FIG. 9, many attentions are needed in case of a traffic signal and moving patterns of a visual-line direction are complicated.

At this time, an approximate curve having a low degree of a polynomial can be applied to the moving directions of a visual-line direction E2 shown in FIG. 8. Using this approximation, it is judged whether each object is visually recognized or not.

Figure 10:
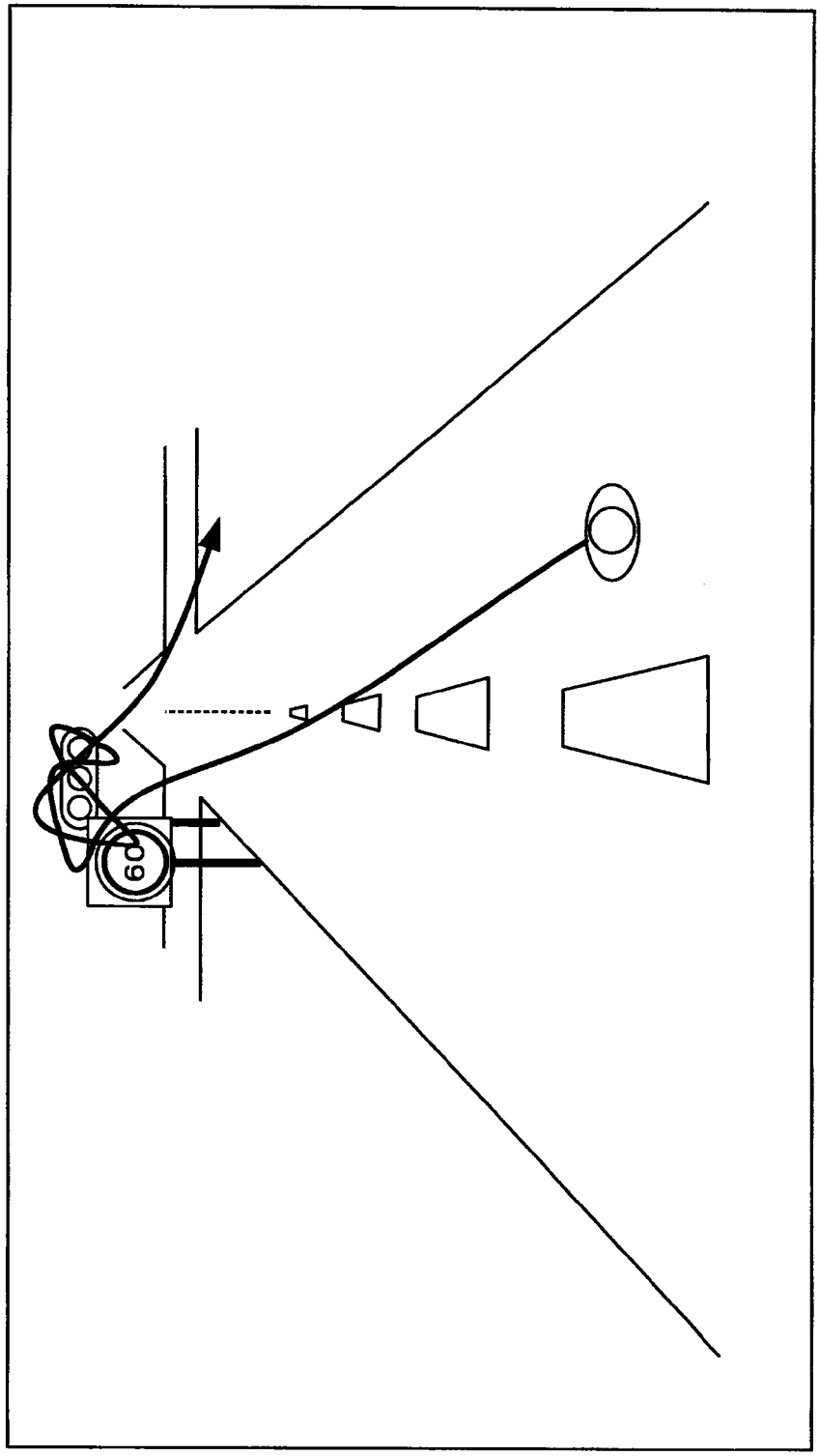
FIG. 10 is a diagram showing an example of a movement pattern of a visual-line direction when a plurality of watched targets are located in the vicinity of the safety-drive assistance device according to the third embodiment of the invention.
Figure 11:
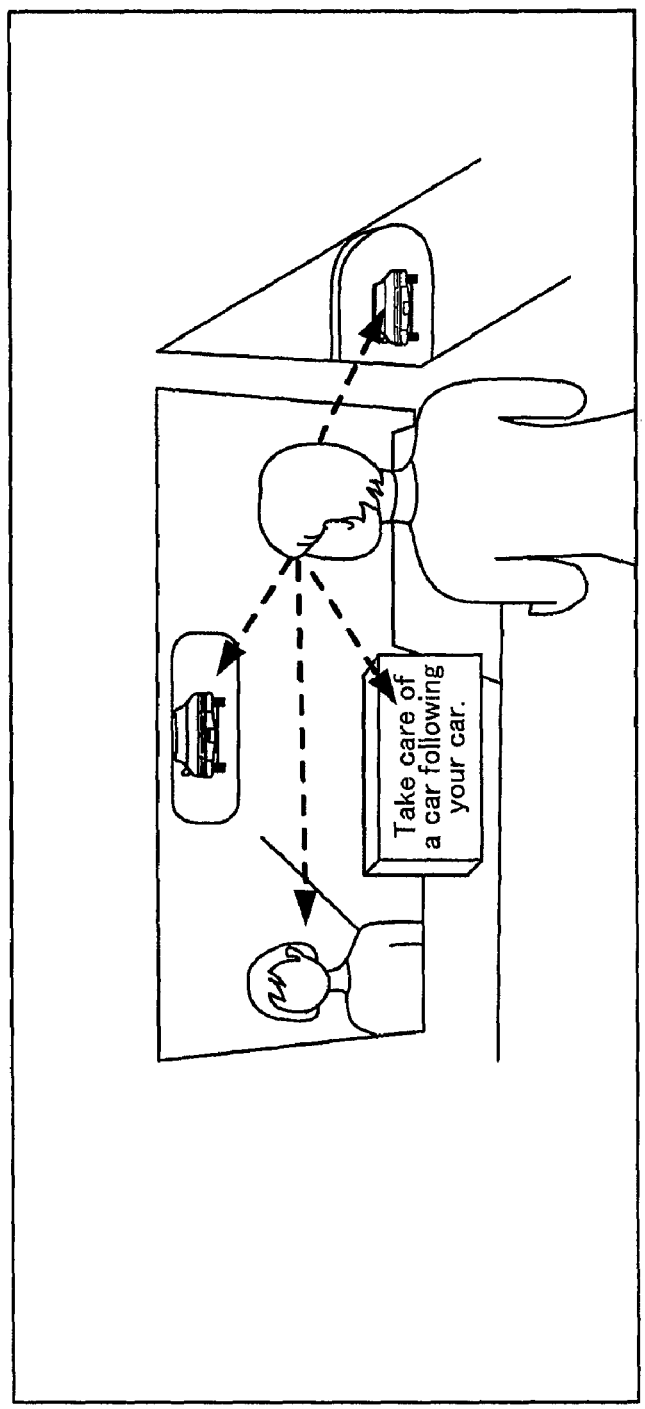
FIG. 11 is a schematic view of the conventional safety-drive assistance device.
Figure 12:
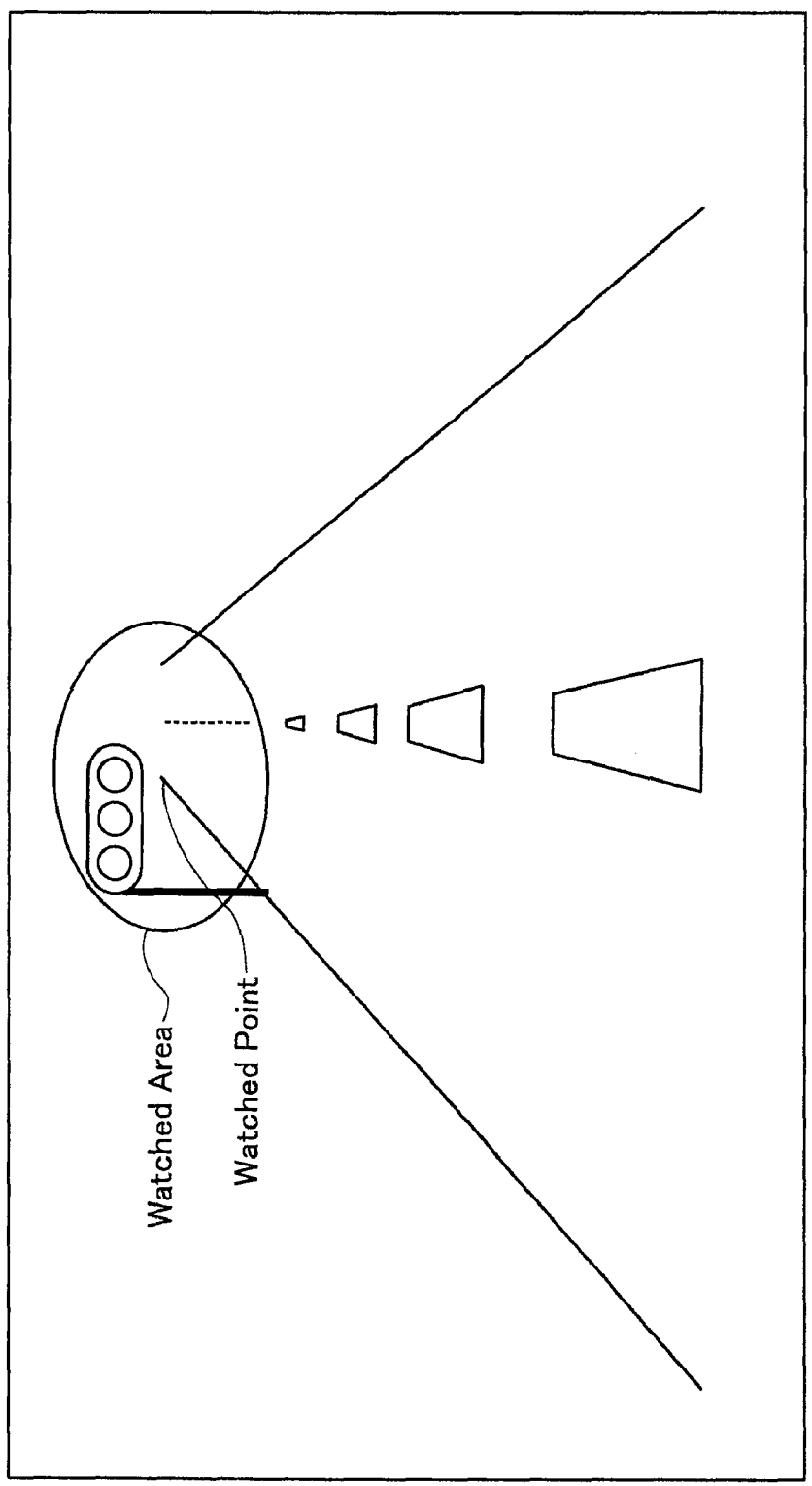
FIG. 12 is a schematic view of the other conventional safety-drive assistance device.
Figure 13:
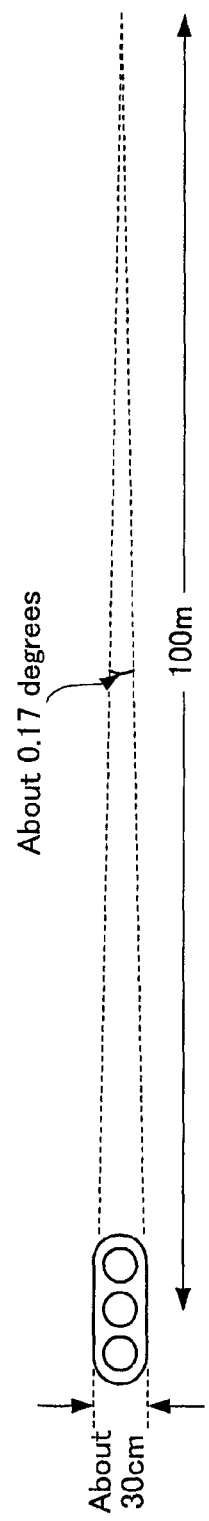
FIG. 13 is a diagram explaining accuracy of detecting a visual-line direction in the conventional safety-drive assistance device.
Figure 14:
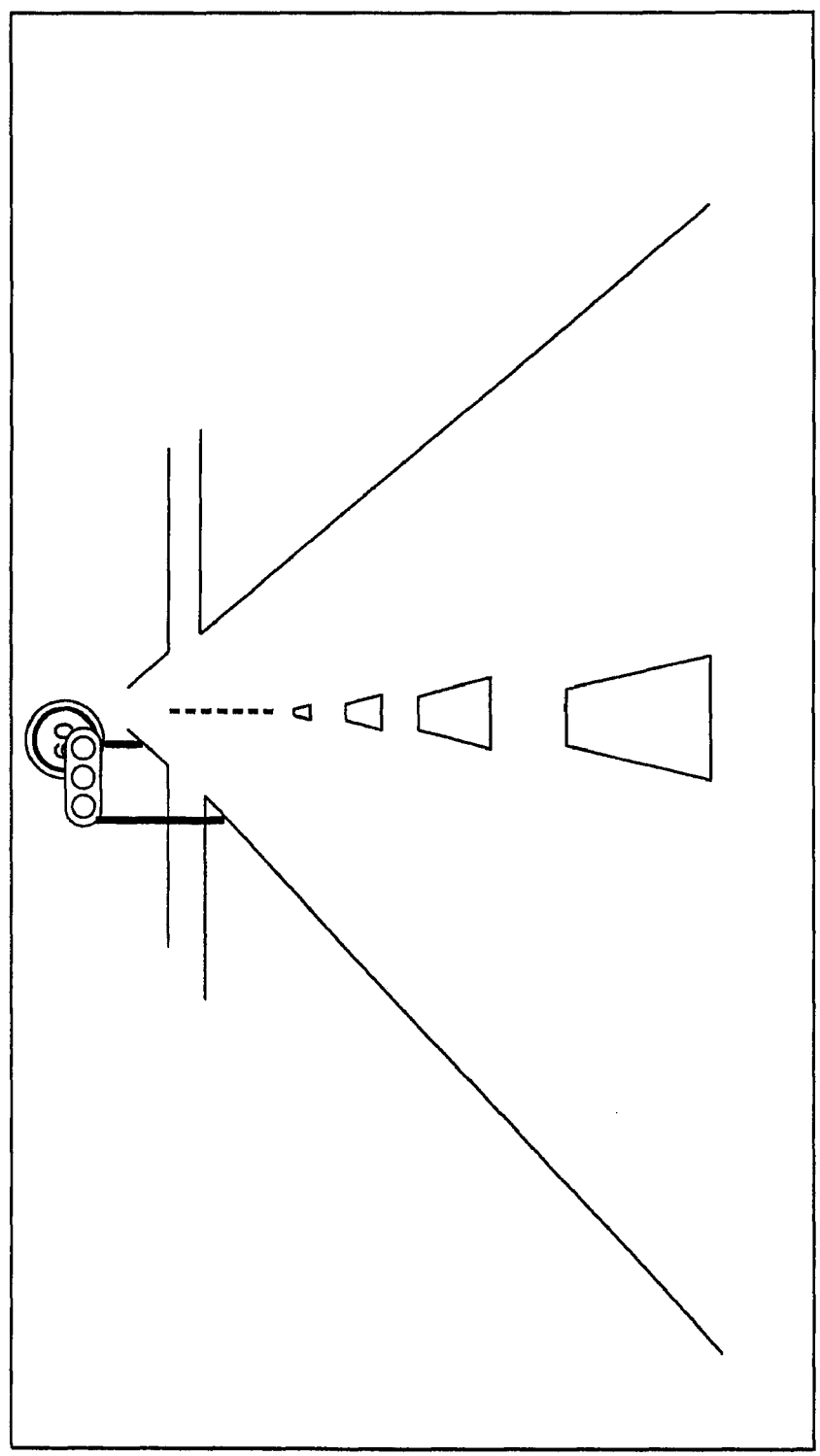
FIG. 14 is a diagram explaining an example of a case when it is impossible for the conventional safety-drive assistance device to determine visual recognition.

Namely, as shown in FIG. 10, if an object to be judged as visually recognized one is in the vicinity of driver in the X-Y two dimensional space, it is judged by using moving patterns of a visual-line direction which one of a road mark and a traffic signal a driver looks at.

First, sampled points of a visual-line direction are obtained. These are obtained by the same method in the first embodiment. Next, an approximate curve having a low degree of a polynomial can be applied to these sampled points.

At this time, if application of the approximate expression is good, it judged that a driver looks at a road mark. If application of the approximate expression is bad, it judged that a driver looks at a traffic signal. With respect to a degree of application (a degree of coincidence), it is judged that application is good if a multiple liner regression coefficient is more than a predetermined value in multiple liner regression analysis of calculating an approximate expression.

This above method can judge which object among plurality of objects a driver visually recognizes even if a driver looks at a plurality of objects t to be recognized, which are overlapped toward the direction of a driver's visual-line direction.

The visual recognition judging unit 14 holds moving patterns of a visual-line direction in a case of visual recognition every kinds of the objects and judges whether a driver visually recognizes the object or not depending on the degree of coincidence between a moving pattern of a visual-line direction in the case of visual recognition, and a moving pattern of a visual-line direction in the vicinity of an object which is a watched target. Hence, it can judge which object a driver looks at even if a plurality of objects t to be recognized, are overlapped from the direction of a driver's visual-line direction.

Here, in the embodiment, a method of using an approximated curve is explained as a method of distinguishing any of moving patterns of a visual-line direction. But, accurate data about whether a driver visually recognized in actual may be prepared and their moving patterns may be judged using a non-linear model such as a neural network.

Further, moving patterns of a visual-line direction are classified depending on kinds of objects themselves. But, objects may be classified depending on their sizes in the X-Y two dimensional space or brightness of objects. Then, sizes of objects in the X-Y two dimensional space or brightness of objects may be detected and then visual recognition may be judged.

INDUSTRIAL APPLICABILITY

As described above, the safety-drive assistance device of the present invention has advantage in that it can judges whether a driver recognizes an object to which a driver should pay an attention or not even if an accuracy of detecting a visual-line direction is almost equal to 1 degree. The device is useful for informing a driver about whether there are risks such as collision, rear-end collision and contact to a pedestrian or not.

The invention claimed is:

1. A safety-drive assistance device for assisting a driver in driving a vehicle under a traffic environment, said vehicle having a first camera for taking an image of an outside of said vehicle, and a second camera for taking an image of an inside of said vehicle, comprising:
   - a traffic environment detecting unit operable to detect a watched target in said traffic environment from said image taken by said first camera;
   - a visual-line direction detecting unit operable to detect a direction of a visual line of said driver on the basis of said image of two eyes or one eye of said driver taken by said second camera; and
   - a visual recognition judging unit for making a judgment whether said driver visually recognizes said watched target or not, wherein said visual recognition judging unit is:
   - operable to calculate a first vector of a moving pattern, during a predetermined period, regarding said watched target mapped on a two dimensional space intersected by a line between the position of an eye of said driver and said watched target;
   - operable to calculate a second vector of a moving pattern, during said predetermined period, of an intersection point of said two dimensional space with said visual line of said driver detected by said visual-line direction detecting unit; and
   - operable to make said judgment based on an inner product of said first vector with said second vector and a magnitude of said first vector.

2. The safety-drive assistance device according to claim 1, wherein
   said visual recognition judging unit judges that said driver visually recognizes said watched target if said intersection point is in the vicinity of said watched target and the amount of moving of said second vector in a direction directing to said watched target or backing away from said watched target is changed larger or equal to a predetermined amount.

3. The safety-drive assistance device according to claim 1, further comprising a watched target judging unit operable to judge said watched target, on the basis of a predetermined threshold, from objects detected by said traffic environment detecting unit.

4. The safety-drive assistance device according to claim 1, further comprising a non-safety recognition judging unit operable to judge whether said driver recognizes non-safety or not on the basis of the result of said judgment made by the visual recognition judging unit.

5. The safety-drive assistance device according to claim 4, further comprising a presentation unit operable to present information corresponding to said watched target when said non-safety recognition judging unit judges that said driver does not recognize non-safety.

6. The safety-drive assistance device according to claim 1, wherein said visual recognition judging unit is operable to calculate said first vector on the basis of said watched target mapped to said two dimensional space at starting time and ending time of said predetermined period, and operable to calculate said second vector on the basis of the position of said intersection point at starting time and ending time of said predetermined period.

* * * * *